No. 781,651. PATENTED FEB. 7, 1905.
H. W. HELLMANN.
STEERING GEAR FOR MOTOR CARS.
APPLICATION FILED JUNE 23, 1902.
3 SHEETS—SHEET 1.
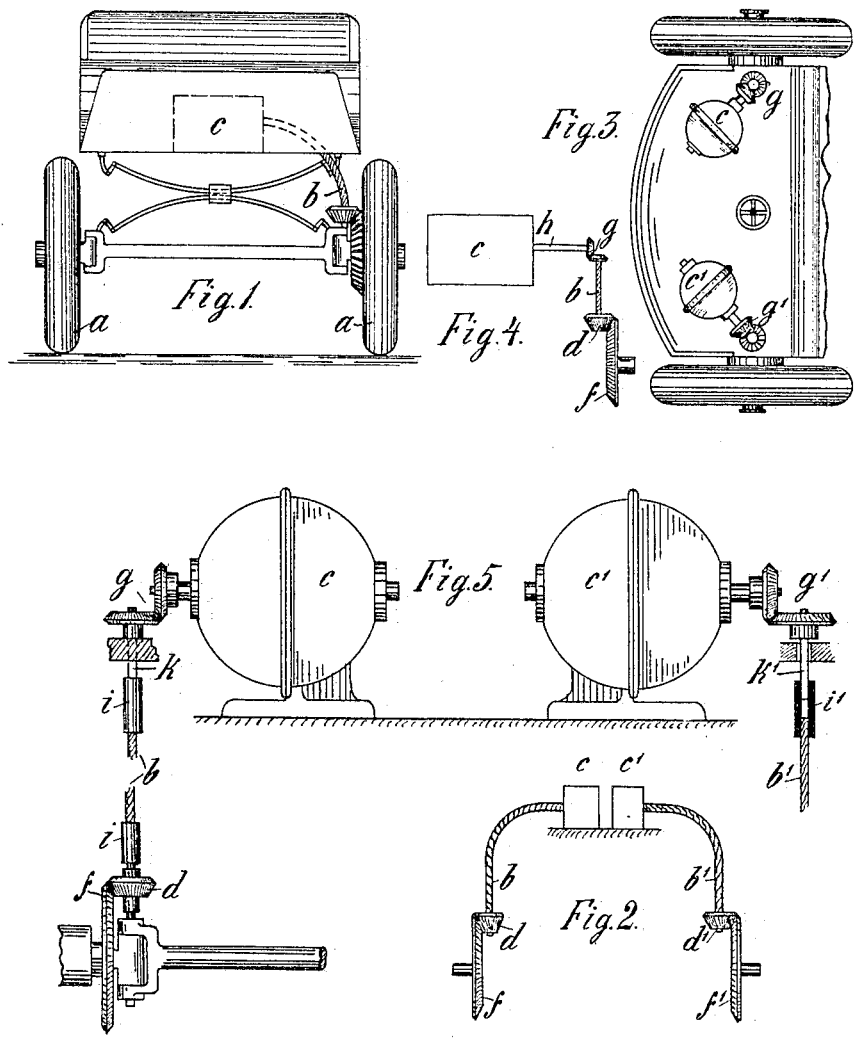

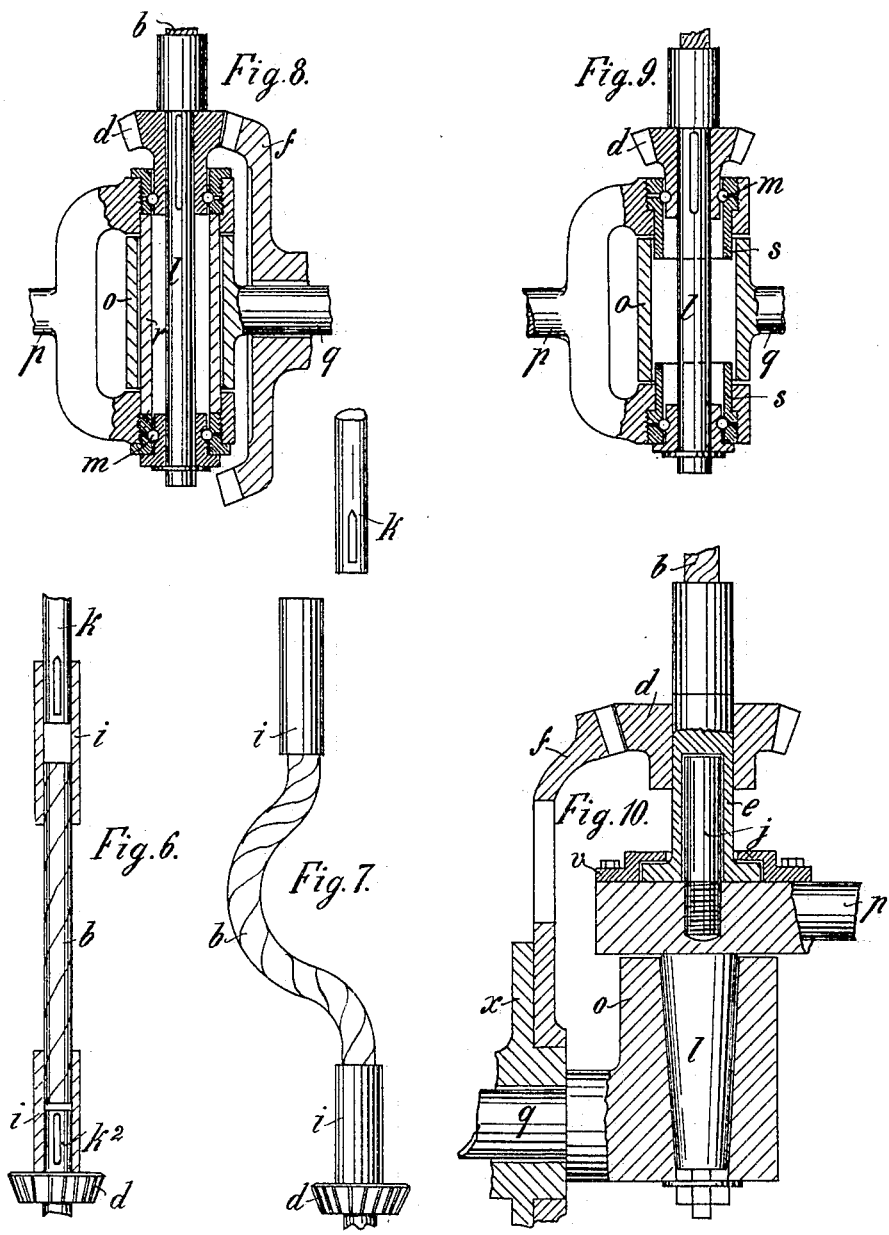

No. 781,651. PATENTED FEB. 7, 1905.
H. W. HELLMANN.
STEERING GEAR FOR MOTOR CARS.
APPLICATION FILED JUNE 23, 1902.
3 SHEETS—SHEET 3.
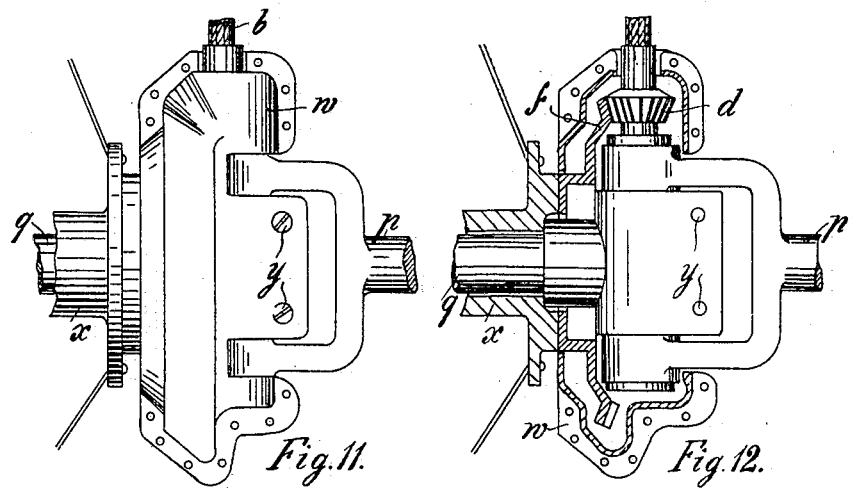
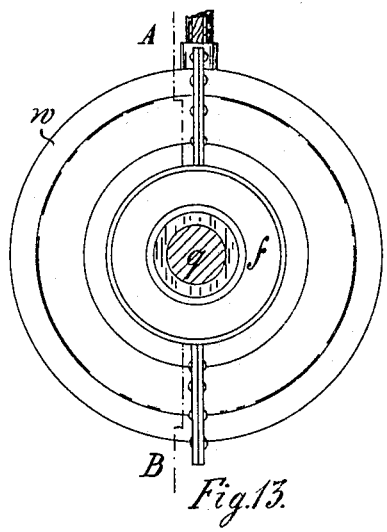
Witnesses:
Inventor:
Heinrich Wilhelm Hellmann No. 781,651.

Patented February 7, 1905.

UNITED STATES PATENT OFFICE.

HEINRICH WILHELM HELLMANN, OF BERLIN, GERMANY.

STEERING-GEAR FOR MOTOR-CARS.

SPECIFICATION forming part of Letters Patent No. 781,651, dated February 7, 1905.

Application filed June 23, 1902. Serial No. 112,766.

*To all whom it may concern:*

Be it known that I, HEINRICH WILHELM HELLMANN, engineer, of 7 Zinzendorfstrasse, Berlin, Germany, do hereby declare the nature of my invention concerning Improvements in Steering-Gear for Motor-Cars and in what manner the same is to be performed to be described and ascertained by and in the following statement.

My invention relates to a gearing for the steering-wheels of motor-cars, especially electrically-driven cars.

According to my invention the steerable fore wheels are geared in such a way that an even distribution of the load is obtained, and in consequence an even friction of the two steering-gear wheels, free mobility of the car and the steering-gear, reduction of the strain on the car-wheel gear, both by the weight of the motors, as also by the weight of the whole motor-car, convenient access to the driver's seat and to the motors, and the facility of installing motors of smallest possible weight. These advantages I obtain by arranging the motor or motors above the steering-wheels with their axles in a horizontal position within the elastically-suspended fore-frame of the car and connecting the motor-axles either directly or by means of an intermediate bevel-wheel gear and flexible shafts with the car-wheel gear. A nave over the axle-arm and concentric to the driving-shaft is seated independent of the latter, so that the pressure by the weight of the motor-car is kept off from the driving-shaft.

The great mobility of and the reduction of strain on this steering-gear could only be obtained by this invention—a combination of designs partly known already in motor-car construction—by no means, however, by using exclusively rigid driving-shafts or gears working under heavy strain. For obtaining a continuous faultless working of the motor-car further provisions have been made to effectively protect the more delicate parts of the steering-gear from dirt and dust.

The following description, together with the drawings, will explain my invention in a detailed manner.

Figure 1 is the front view of the vehicle. Figs. 2, 4, and 5 are special arrangements of the gear and the motors. Fig. 3 is the front end of a motor-car seen from above. Figs. 6 to 10 are details of the device for the convenient interchange of the flexible shaft and of released arrangements of the driving-shaft. Figs. 11 to 13 show the incasing of the gear in a dirt-proof casing.

In the front view of a motor-car, Fig. 1, in which the steering-wheels $a$ are driven by means of a flexible shaft $b$ by only one motor $c$, arranged with its axle in horizontal position within the elastically-suspended fore-frame.

Fig. 2 shows a steering-gear in which two motors $c\ c'$ drive each one of the two steering-wheels independently by means of flexible shafts $b\ b'$ and bevel-gears $d\ f$ and $d'\ f'$, respectively.

Fig. 3 gives the plan of the fore-frame, showing the mode of gearing the two steering-wheels by two horizontally-arranged electric motors $c\ c'$ by aid of an intermediate gear, each ($g\ g'$) consisting of suitable bevel-wheels. This arrangement of the motors affords a practical and even distribution of the weight of the two motors on both steering-wheels and allows of using high-speed and consequently light and cheap motors for driving the car.

If only one motor is to be used for driving the steering-wheels and an even distribution of the weight of the motor on the two fore wheels is desirable, I advise design Fig. 4, in which the shaft $h$ of the motor $c$ parallel to the car-axle is extended and the flexible shafts driven by aid of bevel-gears.

Fig. 5 shows the arrangement of the steering-wheel gear with two electric motors $c\ c'$, intermediate gears $g\ g'$ and vertically-guided flexible shafts $b\ b'$ being employed. This figure shows the mode of connecting the flexible shafts $b\ b'$ with the rigid shaft ends $k\ k'$, carrying the bevel-gears, by the sleeves $i$. (Shown in a larger scale in Figs. 6 and 7.) This arrangement allows of conveniently and quickly exchanging the flexible shafts in the manner shown in Fig. 7, without having to remove any further parts. The sleeves $i$ are fastened to the ends of the flexible shafts $b$ and are slipped over the rigid shaft ends $k\ k^2$, provided with tongues.

Figs. 8 and 9 show two modes of arranging the relieved driving-shaft within the axis of oscillation of the axle-arm. A nave concentric to the driving-shaft is hereby seated independent of the driving-shaft. Under these circumstances the driving-shaft cannot be harmfully influenced by the bearing pressure caused by the weight of the motor-car. As shown in Fig. 8, the driving-shaft $l$ being the extension of the flexible shaft $d$ is seated in the bifurcation of the car-axle. For this purpose ball-bearings $m$ are advantageously employed. Further, a sleeve $r$ concentric to shaft $l$ is fitted into this bifurcation with such a bore that this sleeve serves as axis of oscillation of the bush $o$ over the oscillating axle-arm $q$. Fig. 9 shows a relieved seating of the driving-shaft, in which in place of a separate bush the journals $s$ of the ball-bearings are extended bush-like, so that they fit into the nave $b$ of the axle-arm $q$ and serve as axis of oscillation for the latter.

Fig. 10 gives a sectional view of another mode of arranging the steering-wheel gear, in which the bearing of the driving-wheel $d$ is within the axis of oscillation of the axle-arm, yet remains independent of the same. The driving-wheel $d$ is fastened to a sleeve $e$, which is loose on a pin $j$, screwed into the car-axle, but independent of the bearing of the axle-arm. A cover-plate $v$ holds sleeve $e$ in its position on pin $j$.

To protect the gear-wheels against dirt they are practically arranged in a casing, the arrangement of which is shown in Figs. 11 to 13. Fig. 11 is a front view of the casing, together with the adjoining parts. Fig. 12 gives a sectional view of the arrangment. Fig. 13 gives a side view of the casing. As may be seen, $p$ is the car-wheel axle, in the bifurcation of which the pin $q$, carrying the car-wheel $x$, is arranged, oscillating with its nave. The axis of oscillation is identical with the axis of the driving-gear $d$. The driven gear $f$ is fixed to the hub of the car-wheel $x$. The casing $w$ consists of two or more parts to be bolted together and connected by the screws $y$, with the sleeve over the arm $q$ flattened out accordingly. If the axle-arm $q$ oscillates, together with the car-wheel and the bevel-wheel $f$, the casing participates in this movement, and thus constantly protects both gear-wheels against dust. So as to enable the casings to oscillate with the car-wheel it is made to close over the boss of the bifurcation of the car-wheel axle. At the same time it is suitably cut out at this spot, as seen in Fig. 11. It is natural that dividing the guard-case into several parts as well as its shape must in each case be suited to requirements and to shape and arrangement of the gear-wheels.

After now having completely described the nature of my invention I do hereby declare that what I claim is—

1. In a motor-car with geared steering-wheels in which the driving-shaft is in the axis of the journal of the oscillating spindle of the steering-wheel, a hollow journal or socket which concentrically surrounds the driving-shaft and is on the carriage-axle mounted independent from the driving-shaft, substantially as and for the purpose described.

2. In a motor-car with geared steering-wheels in which the driving-shaft is in the axis of the journal of the oscillating spindle of the steering-wheel, barrel-liked prolongations of the brasses of the bearings which are provided for the driving-shaft in the fork of the carriage-axle and form a sleeve or socket, which relieves the driving-shaft from the bearing pressure of the carriage-wheel journal, substantially as and for the purpose set forth.

3. In a motor-car with geared steering-wheels in which the driving-shaft is in the axis of the journal of the oscillating spindle of the steering-wheel, hollow journals or sockets on the nave of the carriage-wheel journal which engage into the fork of the carriage-axle and form a sleeve or socket which relieves the driving-shaft from the bearing pressure of the carriage-wheel journal, substantially as and for the purpose set forth.

4. In a motor-car with geared steering-wheels in which the driving-shaft is in the axis of the journal of the oscillating spindle of the steering-wheel, a pin in the axis of the driving-shaft which is fixed to the carriage-wheel axle and surrounded by the socket of the oscillating spindle of the steering-wheel.

5. In a motor-car with geared steering-wheels in which the driving-shaft is in the axis of the journal of the oscillating spindle of the steering-wheel, a hollow journal or socket which concentrically surrounds the driving-shaft and is on the carriage-axle mounted independent from the driving-shaft, a protecting-casing, which consists of several parts and is mounted on the box of carriage-wheel journal substantially as and for the purpose described.

In witness whereof I have hereunto set my hand in presence of two witnesses.

HEINRICH WILHELM HELLMANN.

Witnesses:
  OSKAR AVENDT,
  WOLDEMAR HAUPT.